(12) United States Patent
Aoki

(10) Patent No.: US 9,204,054 B2
(45) Date of Patent: Dec. 1, 2015

(54) METHOD FOR PHOTOGRAPHING A TARGET SUBJECT

(71) Applicant: Olympus Corporation, Shibuya-ku, Tokyo (JP)

(72) Inventor: Takato Aoki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/211,219

(22) Filed: Mar. 14, 2014

(65) Prior Publication Data

US 2014/0267834 A1 Sep. 18, 2014

(30) Foreign Application Priority Data

Mar. 15, 2013 (JP) ................................ 2013-054257

(51) Int. Cl.
*H04N 5/232* (2006.01)
(52) U.S. Cl.
CPC ............................... *H04N 5/23296* (2013.01)
(58) Field of Classification Search
CPC ..................... H04N 5/23296; H04N 5/2628
See application file for complete search history.

(56) References Cited

U.S. PATENT DOCUMENTS

| 7,362,966 | B2 | 4/2008 | Uchiyama | |
|---|---|---|---|---|
| 8,634,000 | B2* | 1/2014 | Ishikawa | 348/240.3 |
| 2005/0012833 | A1* | 1/2005 | Yokota et al. | 348/240.99 |
| 2005/0117033 | A1* | 6/2005 | Matsui | 348/239 |
| 2010/0245532 | A1* | 9/2010 | Kurtz et al. | 348/14.03 |
| 2012/0062692 | A1* | 3/2012 | Tsubusaki et al. | 348/36 |
| 2013/0076944 | A1* | 3/2013 | Kosaka | 348/240.2 |
| 2014/0211070 | A1* | 7/2014 | Uchida | 348/333.09 |

FOREIGN PATENT DOCUMENTS

| JP | 2001-117153 | 4/2001 |
|---|---|---|
| JP | 2002-033949 | 1/2002 |
| JP | 2006-115525 | 4/2006 |

* cited by examiner

*Primary Examiner* — James Hannett
(74) *Attorney, Agent, or Firm* — John C. Pokotylo; Straub & Pokotylo

(57) ABSTRACT

A photographing method includes (a) setting a subject as a target subject; (b) determining, automatically, at least one of whether the target subject is at a periphery of a photographer's photographing range and whether the target subject is leaving the photographer's photographing range; and (c) responsive to one of a determination that the target subject is at a periphery of the photographer's photographing range and a determination that the target subject is leaving the photographer's photographing range, cropping, automatically, an image include the target subject using a digital zoom operation.

10 Claims, 12 Drawing Sheets

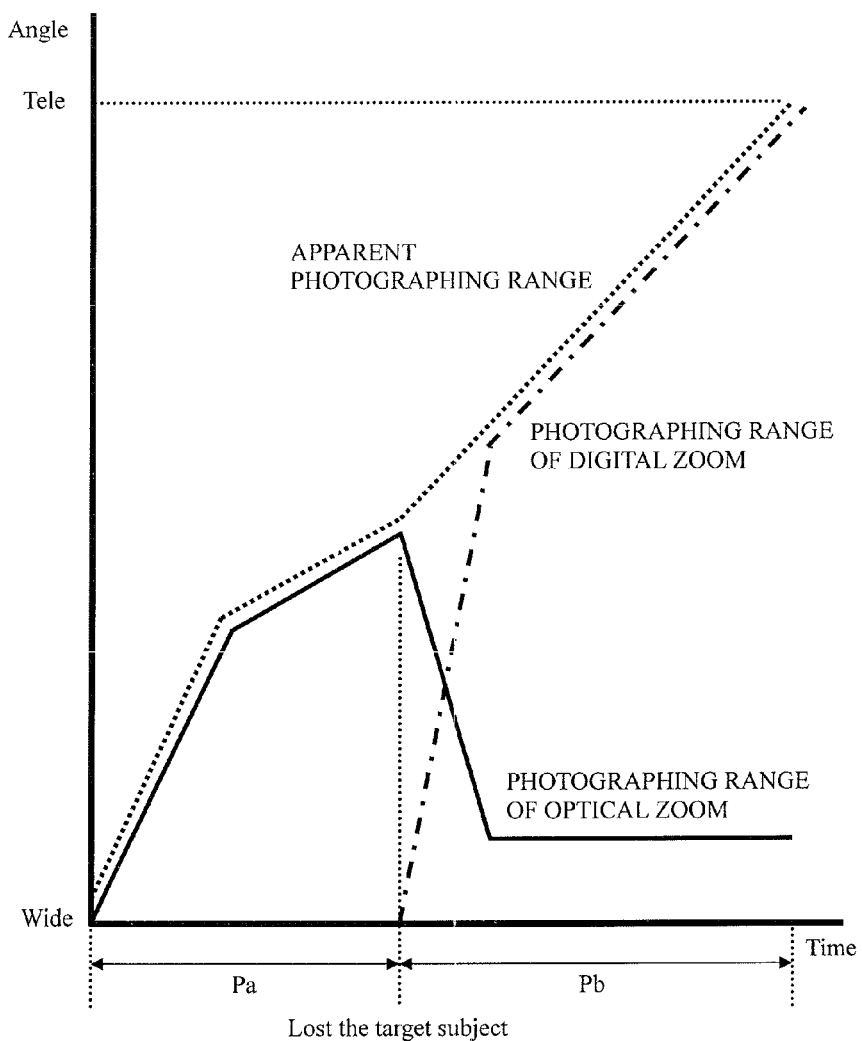

(a)

(b)

(c)

(d)

(e)

(f)

(g)

METHOD FOR PHOTOGRAPHING A TARGET SUBJECT

CROSS REFERENCE TO RELATED APPLICATION

This application is based upon, and claims the benefit of priority from, the prior Japanese Patent Application No. 2013-054257, filed Mar. 15, 2013, the entire contents of which are incorporated herein by reference.

BACKGROUND OF THE INVENTION

1. Field of the Invention

The present invention relates to a photographing method, apparatus and non-transitory medium storing a recorded program, in which zooming by an optical zoom and cropping an image by a digital zoom are both controlled to capture a target subject.

2. Description of the Related Art

Recently, a digital camera can execute various shooting functions using image processing.

Many digital cameras are provided with an optical zoom.

Optical zooming is performed by moving zoom lenses back and forth along an optical axis in accordance with a photographer's manual zoom operation.

Further, digital cameras which can perform digital zooming, by which a portion of an image sensor currently is used to provide cropped image data, are also popular.

Recently, zoom ranges have become larger. Accordingly, even a distant subject can be enlarged and photographed with an adequate size.

Unfortunately, however, the target subject might leave a photographing range when an angle of view is changed from a wide angle to a telephoto angle at a high speed.

Japanese Patent Laid-Open No. 2012-60595 discloses a technology for controlling a zoom position so as to change the angle of view to a wide angle when a target subject leaves the photographing range.

However, according to the above-described technology, zooming is automatically performed to change to the wide angle even though the photographer might want to zoom to the telephoto angle. As a result, the photographer may become confused or disoriented, especially if the automatic change is abrupt.

Example embodiments consistent with the present invention aim to provide a digital camera and a photographing method by which departure of the target subject from the photographing range is prevented, while avoiding confusing or disorienting the photographer.

SUMMARY OF THE INVENTION

A photographing method comprising; setting a subject as a target subject, detecting at least one of the target subjects being periphery of the photographer's photographing range and the target subject going out of a photographer's photographing range, cropping an image include the target subject by a digital zoom.

The photographing method according to the present invention further comprising; zooming-out by an optical zoom.

The photographing method according to claim 1 characterized by; reducing at least one of a zoom-in speed by the optical zoom and a cropping range changing speed by the digital zoom when the target subject is located on the periphery.

The photographing method according to the present invention characterized by; controlling a timing of the cropping in accordance with a speed of the optical zoom.

The photographing method according to the present invention characterized by; doing the zooming out and the cropping when the target subject goes out of the photographer's photographing range due to at least one of the optical zooming in, a moving of the photographer's photographing range and a target subject's moving.

The photographing method according to the present invention characterized by; cropping the image so as to the target subject be near a center of the photographer's photographing range.

The photographing method according to the present invention characterized by; keeping a changing speed of a photographer's photographing range constant.

DESCRIPTION OF THE PREFERRED EMBODIMENTS

Embodiments of the present invention will be described below with reference to drawings.

In the following, zoom processing by driving zoom lenses is referred to as "optical zoom" and change of the photographer's photographing range by cropping an image is referred to as "digital zoom."

First Embodiment

Figure 1:
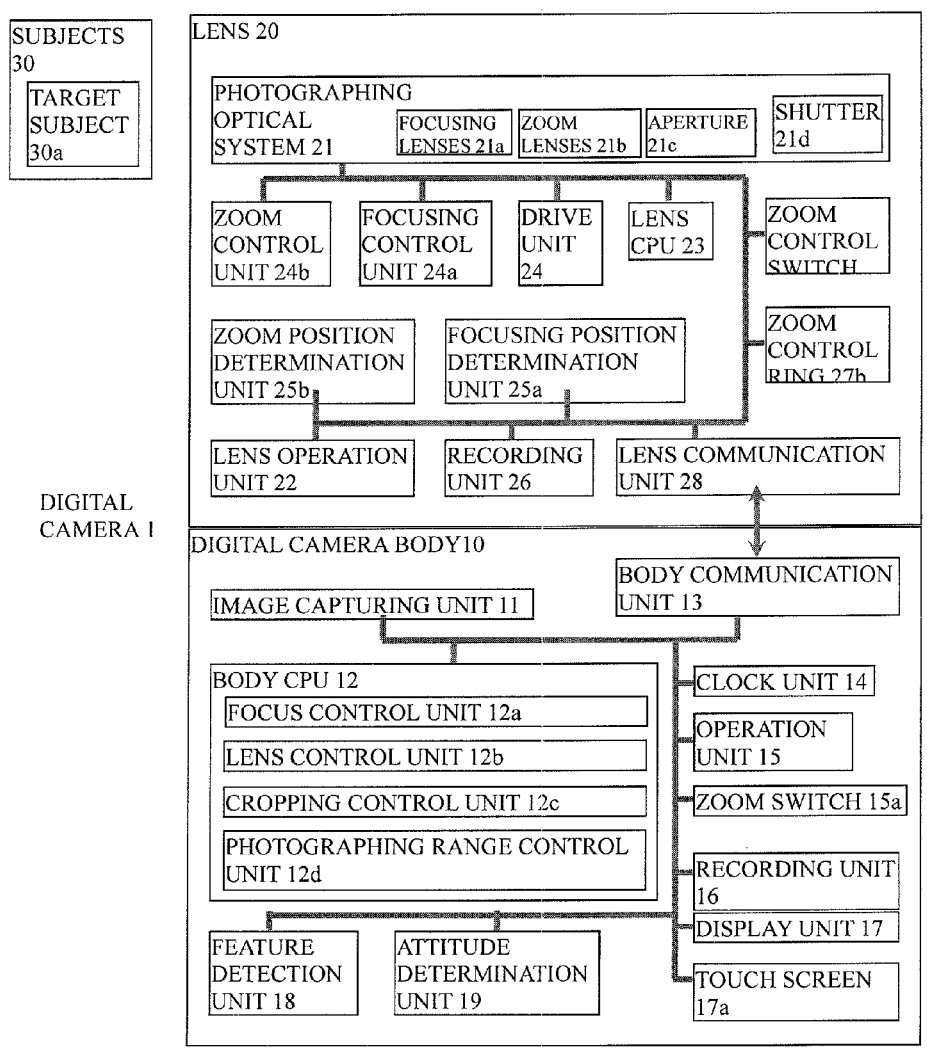
FIG. 1 is a block diagram showing a circuit configuration of an example digital camera that may be used to support various example embodiments of the invention.

FIG. 1 is a block diagram showing a circuit configuration of a digital camera that may be used to support various example embodiments of the present invention.

As shown in FIG. 1, the digital camera 1 includes a digital camera body 10 and a lens unit 20.

The digital camera body 10 includes an image capturing unit 11 which includes an image sensor using, for example, a CCD image sensor or a CMOS image sensor. The image capturing unit 11 photoelectrical converts an image of the subject 30, formed by the lens 20, to acquire an image data.

The lens unit 20 includes a photographing optical system 21 for forming an image of the subjects 30 on the image capturing unit 11. The photographing optical system 21 is provided with a plurality of lenses, which include focusing lenses 21a, for focusing on a subject, zoom lenses 21b, for changing the camera's photographing range, an aperture 21c, and a shutter 21d.

A focusing control unit 24a and a zoom control unit 24b are controlled by a drive unit 24 to control the focus lenses 21a and the zoom lenses 21b, respectively. The photographer P controls a zoo control switch 27a or a zoom control ring 27b to control the zoom lenses 21b.

The lens unit 20 is provided a lens operation unit 22 for operating the zoom lenses 21b, the focus lenses 21a, an aperture 21c, and the like. Focus, zoom and aperture are adjusted by operating the lens operation unit 22.

The lens operation unit 22 outputs an operation signal to a lens CPU 23 based on a manual operation by the photographer P. The lens CPU 23 generates focus signals and zoom signals, based on the operation signal from the lens operation unit 22, to control the drive unit 24.

The drive unit 24 drives the focus lenses 21a, the zoom lenses 21b, and the aperture 21c to control focusing, zoom and aperture.

The focusing control unit 21a outputs signals corresponding to a position of the focus lenses 21a to a focusing position determination unit 25a. The zoom control unit 21b outputs signals corresponding to a position of the zoom lenses 21b to a zoom position determination unit 25b.

The focusing position determination unit 25a determines the focusing position based on the signals from the focusing control unit 21a, and then outputs the focusing position to the lens CPU 23. The zoom position determination unit 25b determines the zooming position based on the output from the zoom control unit 21b, and then outputs the zoom position to the lens CPU 23.

After given the focusing position and the zoom position, the lens CPU 23 controls the drive unit 24 so that the focusing position and the zoom position are set in accordance with the operation of the lens operation unit 22.

The lens unit 20 is provided a lens communication unit 28. The digital camera body 10 is provided a body communication unit 13. The lens communication unit 28 sends and receives signals to and from the body communication unit 13 via a predetermined transmission path. The lens CPU 23 sends lens information, zoom information, and the like, stored in a recording unit 26, to the digital camera body 10 via the lens communication unit 28 and the body communication unit 13.

The digital camera body 10 recognizes a zoom function of the lens unit 20, a focal length range of the optical system 21, the focusing position, the zoom position, an f-stop number of the aperture 21c, and the like, based on the lens information and the zoom information.

The lens CPU 23 is configured to be controllable by the body CPU 12 so that control signals are given from a body CPU 12 via the body communication unit 13 and the lens communication unit 28.

Various lenses can be employed in the embodiment. In FIG. 1, an implementation using a lens unit which can perform zoom operations by operating the lens operation unit 22 is shown.

The zoom operations may be performed based on instructions received from the digital camera body 10. When the body 10 is used with an interchangeable lens, the zoom operation may be performed based on instructions of an electronic zoom ring which is attached to the interchangeable lens.

The image capturing unit 11 is controlled by the body CPU 12, captures an image of the subjects 30 via the lens unit 20 and then outputs the image data. The body CPU 12 outputs signals, which drive the image sensor, to the image capturing unit 11 and reads the image data from the image capturing unit 11.

The body CPU 12 may be configured to perform predetermined signal processes, such as color adjustment, matrix conversion processing, noise removal, and/or various other digital processes on the read-out captured image.

The digital camera body 10 is also provided with a clock unit 14 and a body operation unit 15. The clock unit 14 generates timing signals which the body CPU 12 uses. The body operation unit 15 generates operation signals based on manual photographer operations of a zoom switch 15a and/or other operation unit(s) (not shown).

The body operation unit 15 provided in the digital camera body 10 outputs the operation signals to the body CPU 12. The body CPU 12 controls each unit based on the operation signals and stored program instructions.

The body CPU 12 outputs an image data to a recording unit 16. The recording unit 16 records the image data in a recording medium (not shown) such as a memory card. The recorded image is derived from image data from the entire image sensor if the digital zoom does not crop the image. Otherwise the recorded image is derived from image data cropped from a portion of the image sensor by the digital zoom The body CPU 12 outputs the image data to a display unit 17. The display unit 17 displays the image data using, for example, an LCD (not shown) or the like. The displayed image is derived from image data from the entire image sensor if the digital zoom does not crop the image. Otherwise the displayed image is derived from image data cropped from a portion of the image sensor by the digital zoom.

The digital camera body 10 is provided a touch screen 17a. The touch screen 17a is provided on the display unit 17 and generates operation signals corresponding to a position on the display screen at which the photographer P places his or her finger. Thus, for example, the photographer P can specify a target subject 30a displayed in the display unit 17 by touching a corresponding point on the touch screen 17a. The body CPU 12 controls each unit of the camera body 10 to execute functions based on the photographer's operations.

Operation signals related to zoom are included in the operation signals acquired from the body operation unit 15 by operating the zoom switch 15a provided on the digital camera body 10 and the operation signals acquired from the touch screen 17a by touching zoom icons (not shown) displayed in the display unit 17. The body CPU 12 executes the optical zoom and/or the digital zoom based on the operation signals and stored program instructions, and sends the zoom operation information to the lens CPU 23 of the lens unit 20. Operation signals related to zoom are included in the operation signals acquired from a zoom control switch 27a or a zoom control ring 27b provided on the lens 20. The body CPU 12 executes same as above.

The body CPU 12 includes a focus control unit 12a, a lens control unit 12b, a cropping control unit 12c, and a photographing range control unit 12d. The focus control unit 12a performs focus control according to a phase difference detection method when pixels for focus control are included in the image capturing unit 11. The focus control unit 12a performs focus control according to a contrast method when the pixels for focus control are not included in the image capturing unit 11. Other AF methods (e.g. detection the phase difference, reflection the supersonic wave) are capable too.

Responsive to the input of operation signals related to zoom from the lens operation unit 22, the zoom switch 15a, and/or the touch screen 17a, the lens control unit 12b controls the photographing range control unit 12d to output zoom signals for the optical zoom. The zoom signals from the lens control unit 12b is provided to the lens CPU 23 via the body communication unit 13 and the lens communication unit 28.

Responsive to the input of operation signals related to zoom from the lens operation unit 22, the zoom switch 15a, and/or the touch screen 17a, the cropping control unit 12c sets a cropping position of the image.

The camera body 10 further includes a feature detection unit 18 and an attitude determination unit 19. Output signals of a feature detection unit 18 and an attitude determination unit 19 and the operation signal related to zoom from the lens operation unit 22, the zoom switch 15a, and/or the touch screen 17a are input to the photographing range control unit 12d.

The feature detection unit 18 detects a feature amount of the subjects 30 (i) which are located near the central part in the photographer's photographing range, (ii) which have been designated by the photographer P, (iii) which occupy the photographer's photographing range largely, and/or (iv) which move at more than a predetermined speed.

The feature detection unit 18 then outputs its result to the photographing range control unit 12d. The attitude determination unit 19 detects an angle and direction of the digital camera body 10, and then outputs its result to the photographing range control unit 12d.

Based on the detection result of the attitude determination unit 19, when the feature detection unit 18 detects that the sky is being photographed, the feature detection unit 18 may detect the feature amount regarding a high-contrast area as the target subject 30a.

- a. "Photographer's photographing range" is the range, defined by the optical zoom and the digital zoom, to be seen by the photographer, captured by the image capturing unit 11, and recorded by the recording unit 16.
- b. "Camera's photographing range" is the range with only the optical zoom. It is the range to be captured by the entire image sensor.

The photographer's photographing range is narrower than, or equal to, the camera's photographing range. While the digital zoom is not in use, the photographer's photographing range is equal to the camera's photographing range.

Based on the detection result of the feature detection unit 18, the photographing range control unit 12d determines whether or not the target subject 30a is located in the photographer's photographing range. If the photographing range control unit 12d determines that the target subject 30a has gone out of the photographer's photographing range, the photographing range control unit 12d controls the lens control unit 12b and/or the cropping control unit 12c to return the optical zoom to the wide angle and/or to crop the image data by the digital zoom.

During digital zoom processing, the photographing range control unit 12d sets the neighborhood photographer's photographing range as a range to be cropped so that the target subject 30a, which has gone out of the photographer's photographing range, can be included in the photographer's photographing range.

The photographing range control unit 12d changes the photographer's photographing range of the digital zoom according to that of the optical zoom so that the zoom operation by the photographer P can be coincided with a synthesized photographer's photographing range by the optical zoom and the digital zoom.

Relative control may be performed by speeding up the digital zoom when the speed of the optical zoom is fast and by slowing down the digital zoom when the speed of the optical zoom is slow.

That is, a rate of change of the synthesized photographer's photographing range corresponds to a rate of change of the photographer's photographing range of the optical zoom. This reduces the potential for confusing or disorienting the photographer.

The operation according to the example embodiment will be described with reference to a flowchart shown in FIG. 2, in which control of the digital camera 1 is described.

At step S1, the body CPU 12 determines whether or not a state of the digital camera is a photographing mode. If the mode is not the photographing mode, the process is switched to a playback mode (not shown in detail).

If the state of the digital camera is the photographing mode, at step S2, the body CPU 12 acquires the lens information and the lens position information from the lens CPU 23 via the lens communication unit 28 and the body communication unit 13.

At step S3, the body CPU 12 receives the image data from the image capturing unit 11, performs predetermined signal processes, and displays a live view image.

At step S4, the body CPU 12 determines whether or not the zoom operation to the wide angle has been performed. If the zoom operation to the wide angle has been performed, the process proceeds to step S5.

At step S5, the body CPU 12 determines whether or not a zoom position of the optical zoom has reached the wide end. If the zoom position of the optical zoom has not reached the wide end, the process proceeds to step S6 and the body CPU 12 generates a wide-angle zoom signal. The control method then proceeds to step S11.

If, on the other hand, the zoom operation to the wide angle has not been performed at step S4, the process proceeds to step S11.

At step S11, the body CPU 12 determines whether or not the zoom operation to the telephoto angle has been performed.

If the zoom operation to the telephoto angle has been performed, the process proceeds to step S12 (via node 1).

At step S12, the body CPU 12 determines whether or not the zoom operation to the telephoto angle is started.

If the zoom operation to the telephoto angle is started, the process proceeds to step S13 and a feature amount of the target subject 30a is extracted.

The feature detection unit 18 regards a subject 30 which is located in the central part of the photographer's photographing range, or which has been designated by the photographer P, as the target subject 30a and extracts the feature amount of the target subject 30a.

After that, the process proceeds to step S14. Referring back to S12, if, on the other hand, the zoom operation of the telephoto angle is not started, the process proceeds directly to step S14.

At step S14, the photographing range control unit 12d determines whether or not the zoom position of the optical zoom has reached a telephoto end.

If the zoom position of the optical zoom has not reached the telephoto end, the process proceeds to step S15.

At step S15, the target subject 30a is tracked using comparison between an extraction result of the feature detection unit 18 and the feature amount of the image data.

Thereby, a direction of the target subject 30a for leaving the photographer's photographing range (that is, a disappearance direction) is determined.

After that, the process proceeds to step S16.

At step S16, the photographing range control unit 12d determines whether or not the target subject 30a is located outside a predetermined range of the periphery of the photographer's photographing range.

If the target subject 30a is located near the central part in the photographer's photographing range (and is therefore not outside the periphery of the photographer's photographing range, the process proceeds step S18, S23, and S25.

The optical zoom to the telephoto angle is continued.

The process proceeds to step S17b and the photographing range control unit 12d generates a signal for slow optical zoom to the telephoto angle.

As a result, the zoom speed is reduced and variation of the photographer's photographing range is small. This permits the photographer P to easily track the target subject 30a.

If the photographing range control unit 12d detects that the subject has been lost from the photographer's photographing range at step S18, the process proceeds to step S19.

At step S19, the photographing range control unit 12d determines whether or not the optical zoom to the wide angle is possible.

If the optical zoom to the wide angle is possible, the process proceeds to step S20 and the photographing range control unit 12d performs the optical zoom to the wide angle.

Consequently, the photographer's photographing range is widened.

At step S21, while the photographing range control unit 12d performs the optical zoom to the wide angle (step S20), it also performs the digital zoom to the telephoto angle concurrently.

At the time, the photographing range control unit 12d sets the digital zoom so that the change to the wide angle by the optical zoom can be counteracted and the zoom position can be changed to the telephoto angle. In this case (the target subject is located near periphery of the predetermined photographer's photographing range and is inside), the photographer will operate to zoom to telephoto angle, although, the camera controls the optical zoom to wide angle and the digital zoom to telephoto angle. As a result, the photographer feels zooming to telephoto angle.

Further at step S21, the photographing range control unit 12d sets the neighborhood area that the target subject 30a has left as an area to be cropped by the digital zoom.

At step S22, the display unit 17 displays a black dot representing the optical axis. (See, for example, black dot OA in FIGS. 4(b2) and (b3)), if possible.

With the optical zoom returning to the wide angle at step S20, the camera's photographing range is widened and the target subject 30a is easily included in the photographer's photographing range.

If the target subject 30a is included in the photographer's photographing range again, the process proceeds from step S18 to S23 and the photographing range control unit 12d determines whether or not the digital zoom is currently being performed.

Here, if the digital zoom is being performed, then the process proceeds to step S24.

At step S24, the photographing range control unit 12d determines whether or not the target subject 30a is located near the optical axis.

If the target subject 30a is located near the optical axis, the photographing range control unit 12d performs the optical zoom to the telephoto angle at a high speed as shown in step S25.

If the target subject 30a is not located near the optical axis and the optical zoom were to be changed to the telephoto angle, the subject would leave the photographer's photographing range.

Therefore, referring back to S24, if the target subject 30a is not located near the optical axis, the photographing range control unit 12d performs the digital zoom to the telephoto angle at step S21.

As described above, the target subject 30a can be easily tracked and kept in the photographer's photographing range even when zoom is performed to the telephoto angle.

Further, due to combination with the digital zoom, continuous zoom to the telephoto angle can be performed and the photographer P is not confused or disoriented by the operation.

Referring back to S11, there is no zoom operation to the telephoto angle, the camera control process proceeds to step S27. At step S27, the body CPU 12 receives change in the photographing mode and the like. The photographer operates the operation unit 15 or touch screen 17a to change the photographing mode.

At step S28, the body CPU 12 determines whether or not a photographing operation has been performed. If the photographing operation has been performed, the process proceeds to step S28.

At step S29, the focus control unit 12a performs autofocus, and the process continues to step S30.

At step S30, the body CPU 12 and the image capturing unit 11 captures the target subject 30a, and then the recording unit 16 records the captured image. The process then returns to step S1.

Referring back to S28, if the photographing operation has not been performed, the process returns to step S1.

Figure 2A:
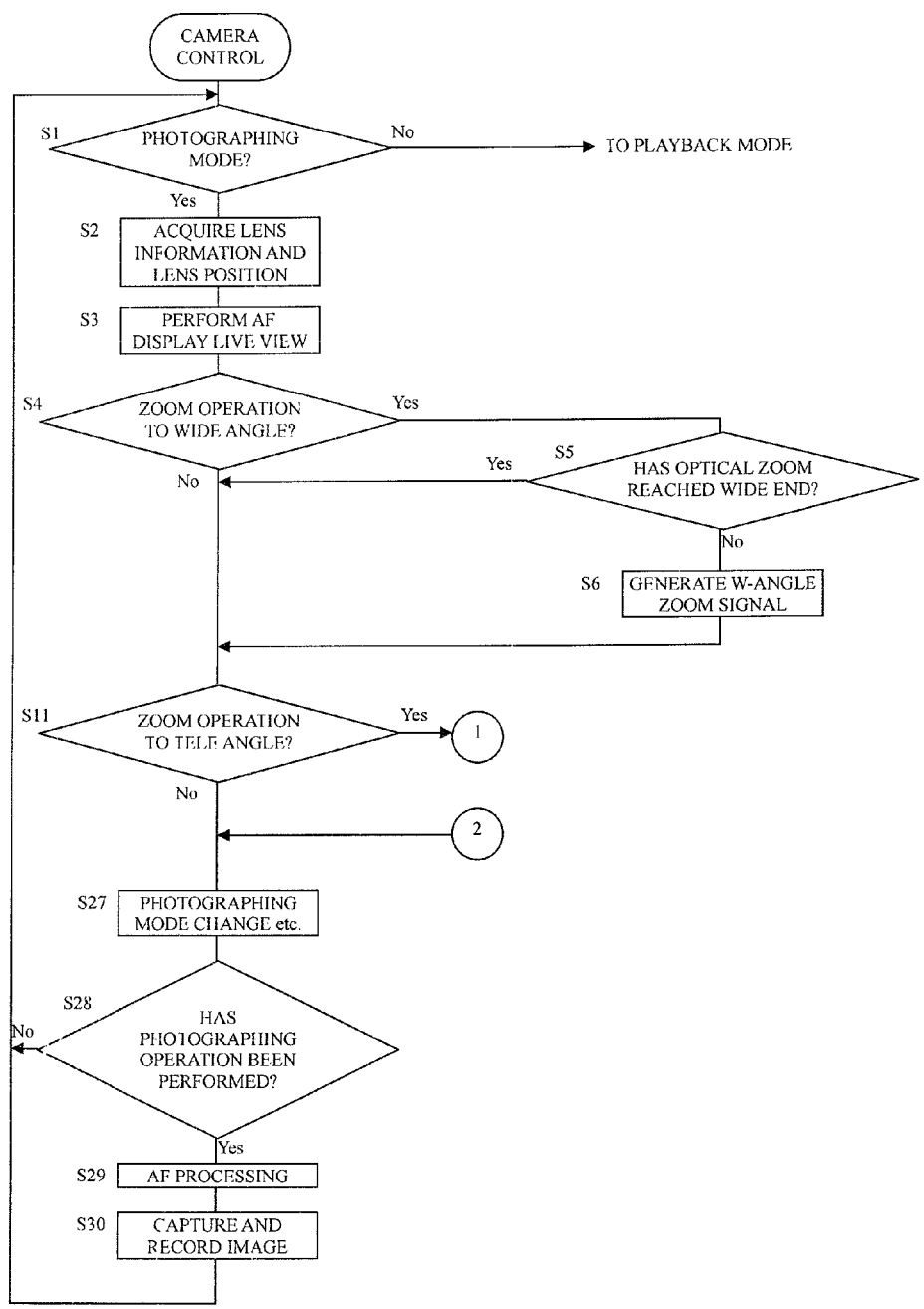
FIGS. 2(a) and 2(b) is a flowchart for describing digital camera control.
Figure 2B:
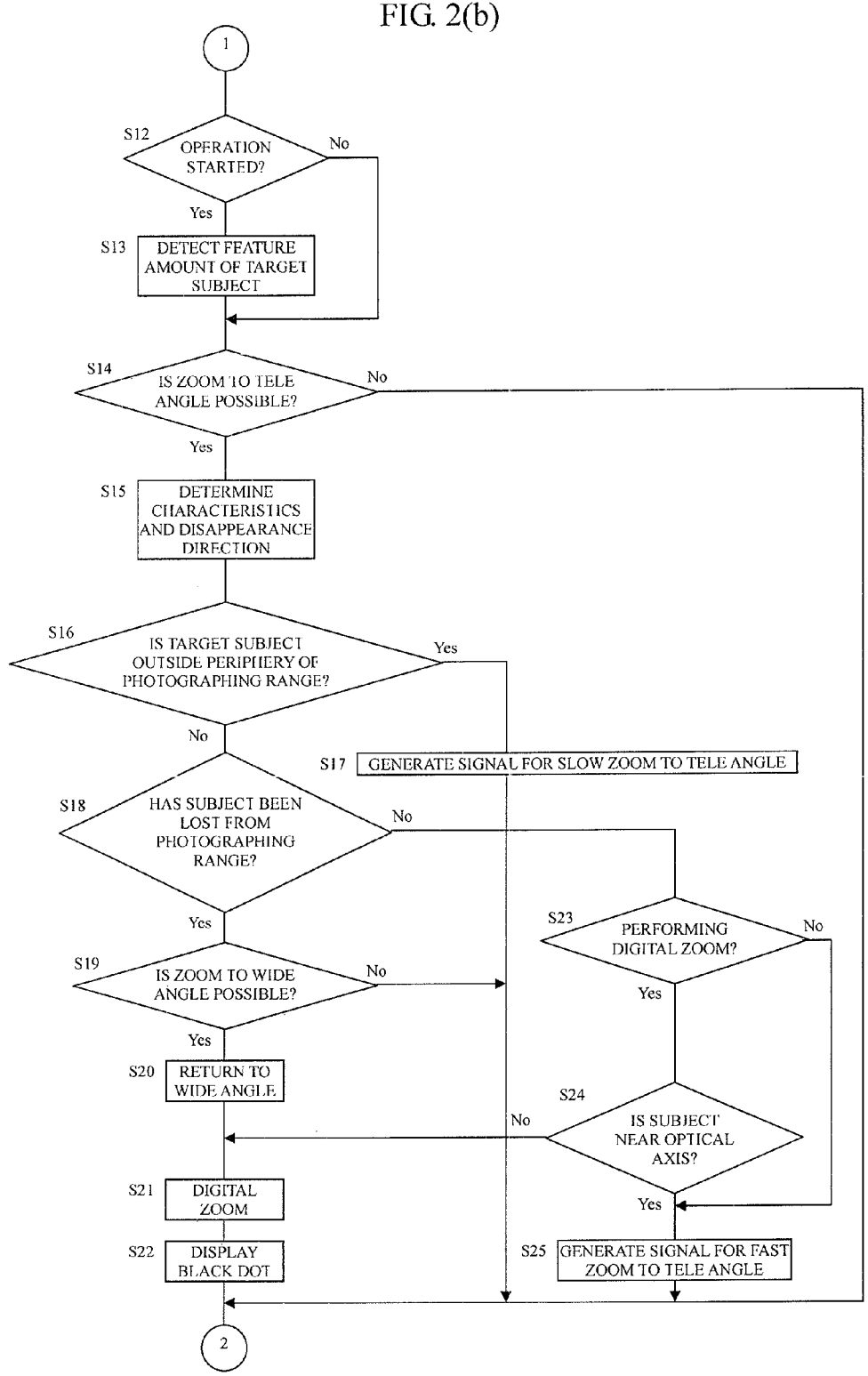
Figure 3:
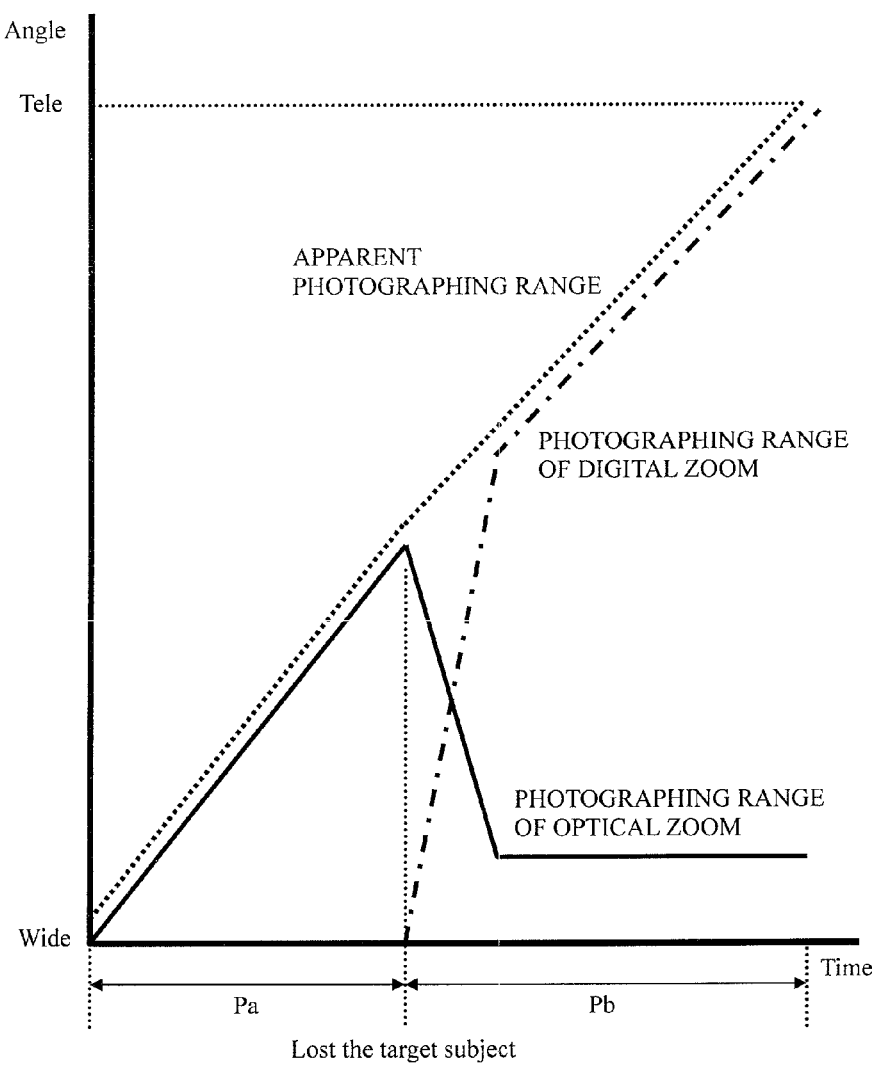
FIGS. 3(a) and 3(b) are graphs showing the change in the angle of the field of view during zoom processing, in which a horizontal axis and a vertical axis represent time and the angle of the field of view, respectively.

An example illustrating operations consistent with the camera control process of FIG. 2 is now described with reference to FIGS. 3(a)-4(b3).

Figure 4:
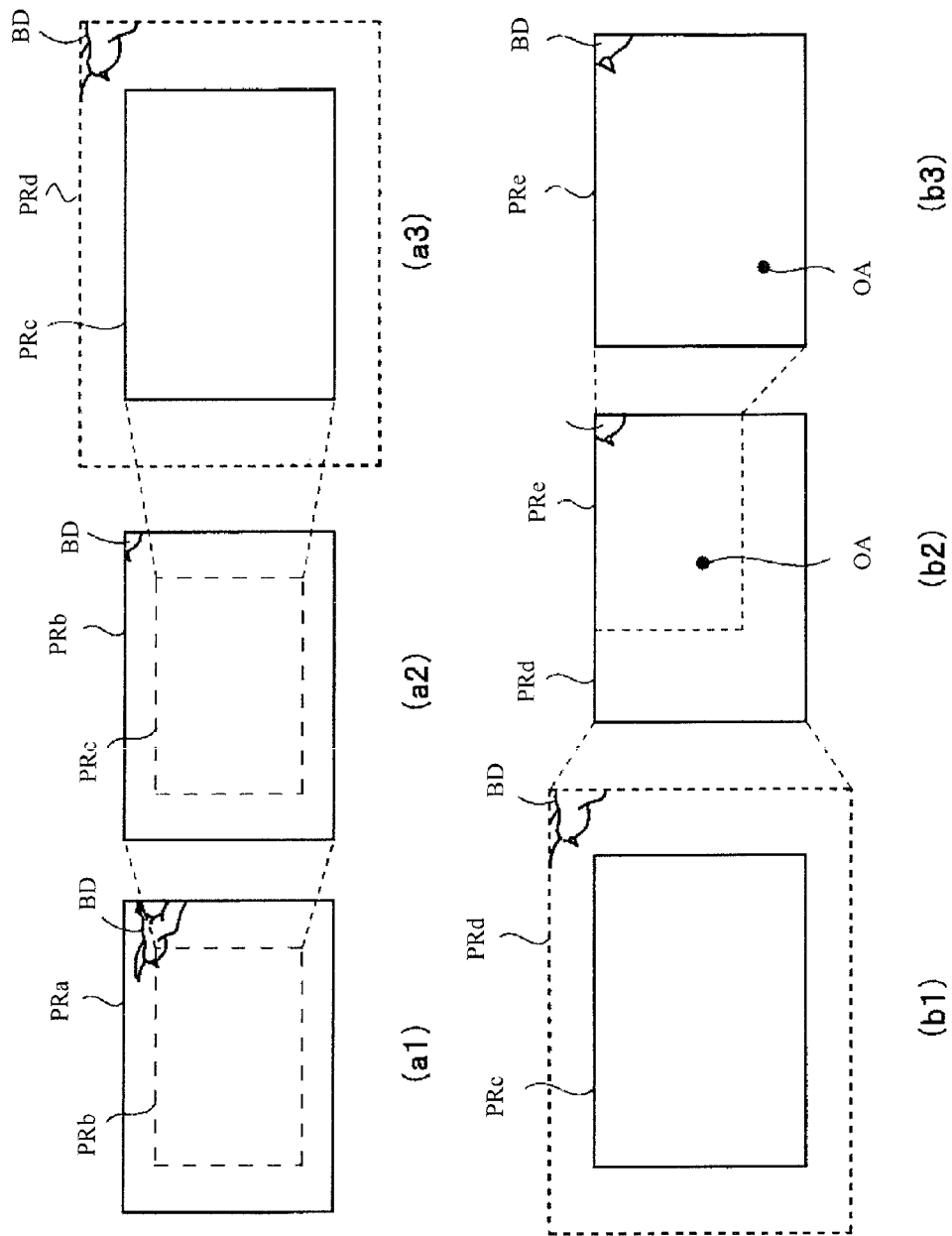
FIGS. 4(a1)-4(a3), 4(b1)-4(b3) are explanatory diagrams showing an example in which the target subject leaves the photographer's photographing range during the zoom operation.

In FIG. 4(a1), the bird BD (that is, the target subject) is located on the periphery of the camera's photographing range PRa at the wide angle.

As shown in FIG. 3(a), if the photographer P performs the zoom operation to the telephoto angle, as depicted by the solid line, the photographer's photographing range becomes smaller in accordance with the optical zoom operation.

According to the example embodiment, the zoom operation to the telephoto angle is performed by the optical zoom during a period Pa in FIG. 3(a).

In FIG. 4(a2), the photographer's photographing range PRb after a predetermined time from start of the zoom operation and the bird BD is partially displayed on the periphery of the photographer's photographing range PRb.

With further zoom operation, the photographer's photographing range PRb changes to PRc in FIG. 4(a3). The bird BD is located out of the photographer's photographing range PRc.

According to the embodiment, when the target subject is determined to have left the photographer's photographing range, the optical zoom to the telephoto angle is stopped and the digital zoom to the telephoto angle is performed while the optical zoom is returned to the wide angle.

For the above-described case, a neighborhood area that the target subject has left is set as a range to be cropped by the digital zoom. Referring to FIG. 3(a), see also the combined photographer's photographing range (dotted line) of the optical zoom (solid line) and the digital zoom (dot-dashed line).

In FIG. 4(a3), a photographer's photographing range PRd in case of the optical zoom to the wide angle is shown.

The bird BD is included again in the photographer's photographing range PRd by the above-described optical zoom.

A synchronized photographer's photographing range (apparent photographer's photographing range) may be changed to the wide angle constantly or slightly by setting the photographer's photographing range of the digital zoom in consideration for the photographer's photographing range of the optical zoom.

FIGS. 4(a3) and 4(b1) show the above-described state (before digital cropping).

The optical zoom is returned to the wide angle when departure is detected, and then the photographer's photographing range is extended as PRd.

At the same time, an upper-right of the photographer's photographing range is cropped by the digital zoom and then a photographer's photographing range PRe is set as a photographer's photographing range, as shown in FIG. 4(b2).

When the bird BD is detected to be included in the photographer's photographing range, the optical zoom is fixed (See the horizontal portion of the solid line of FIG. 3(a).) and zoom is changed to the telephoto angle by the digital zoom (See the second segment of the dot-dashed line of FIG. 3(a) (period Pb in FIG. 3(a)).

During the period Pb in FIG. 3(a), the digital zoom is performed and a photographer's photographing range PRe shown in FIG. 4(b2) is cropped as a photographer's photographing range.

A black dot OA displays the optical axis.

Referring to FIG. 3(a), notice that in the left portion of Pb, when the subject is detected to be out of the photographer's photographing range, the digital zoom is performed to crop the periphery of the subject (See first segment of the dot-dashed line.) while the optical zoom to the telephoto angle is switched to the optical zoom to the wide angle (See the transition from the first segment to the second segment of the solid line.).

Change in the photographer's photographing range due to the optical zoom is compensated by the digital zoom so that the zoom operation can be performed without strangeness. For example, referring to FIG. 3(a), notice that the apparent photographer's photographing ranged depicted by the dotted line has no drastic changes or discontinuities.

Relative control may be performed by speeding up the digital zoom when the speed of the optical zoom is fast and by speeding down the digital zoom when the speed of the optical zoom is slow.

Even when the subject is detected to be included in the photographer's photographing range, the subject may go out of the photographer's photographing range by the optical zoom unless the subject is located near the optical axis.

Therefore the zoom operation to the telephoto angle by the digital zoom is continued. When the subject is located near the optical axis, zoom may be switched from the digital zoom to the optical zoom.

As described above, the photographer's photographing range is enlarged by the digital zoom or the optical zoom during the zoom operation by the photographer P.

Therefore the zoom operation is achieved while departure of the target subject from the photographer's photographing range is prevented without the photographer P becoming confused or disoriented.

The optical zoom to the telephoto angle is continued, in accordance with manual input of the photographer P until the subject is determined to be out of the photographer's photographing range.

However, in FIG. 3(b), a speed of the optical zoom may be reduced when the subject is located near the periphery of the photographer's photographing range at step S17b in FIG. 2. (Compare the slope of the first segment of the solid line with the slope of the second segment of the solid line in FIG. 3(b).)

Thereby, the photographer P can easily track the target subject. Then locating the target subject inside the photographer's photographing range becomes easy.

As described above, according to this example embodiment, when the target subject 30a has left the photographer's photographing range by the optical zoom to the telephoto angle, the optical zoom to the wide angle is performed and the digital zoom to the telephoto angle is performed at the same time. (See the third segment of the solid line and the first segment of the dot-dashed line in FIG. 3(b).)

Under this example embodiment, the photographer's photographing range is widened and the target subject 30a is prevented from leaving the photographer's photographing range.

Additionally, the photographer's photographing range is not drastically or discontinuously changed, which prevents the photographer from becoming confused or disoriented.

Second Embodiment

Figure 5A:
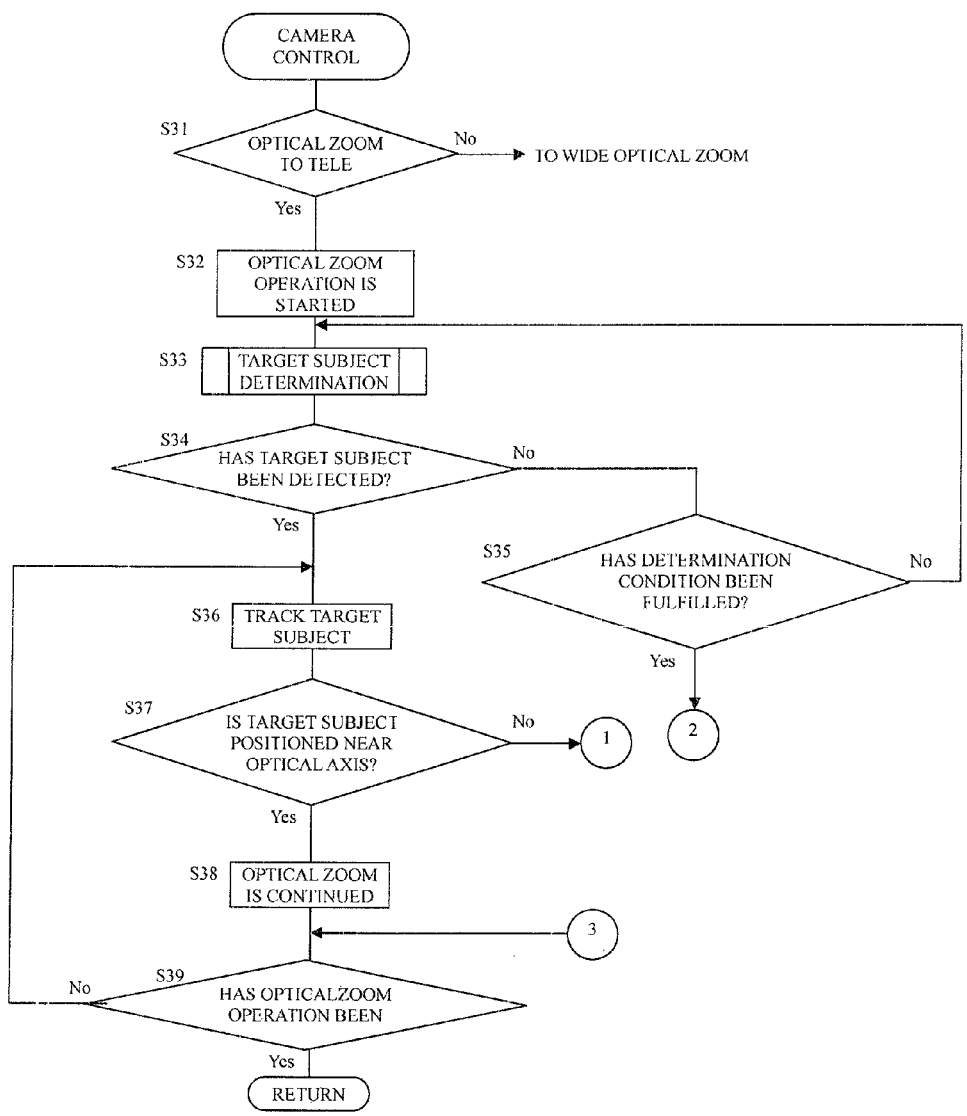
FIGS. 5(a) and 5(b) is a flowchart for describing digital camera control operations in a second embodiment.
Figure 5B:
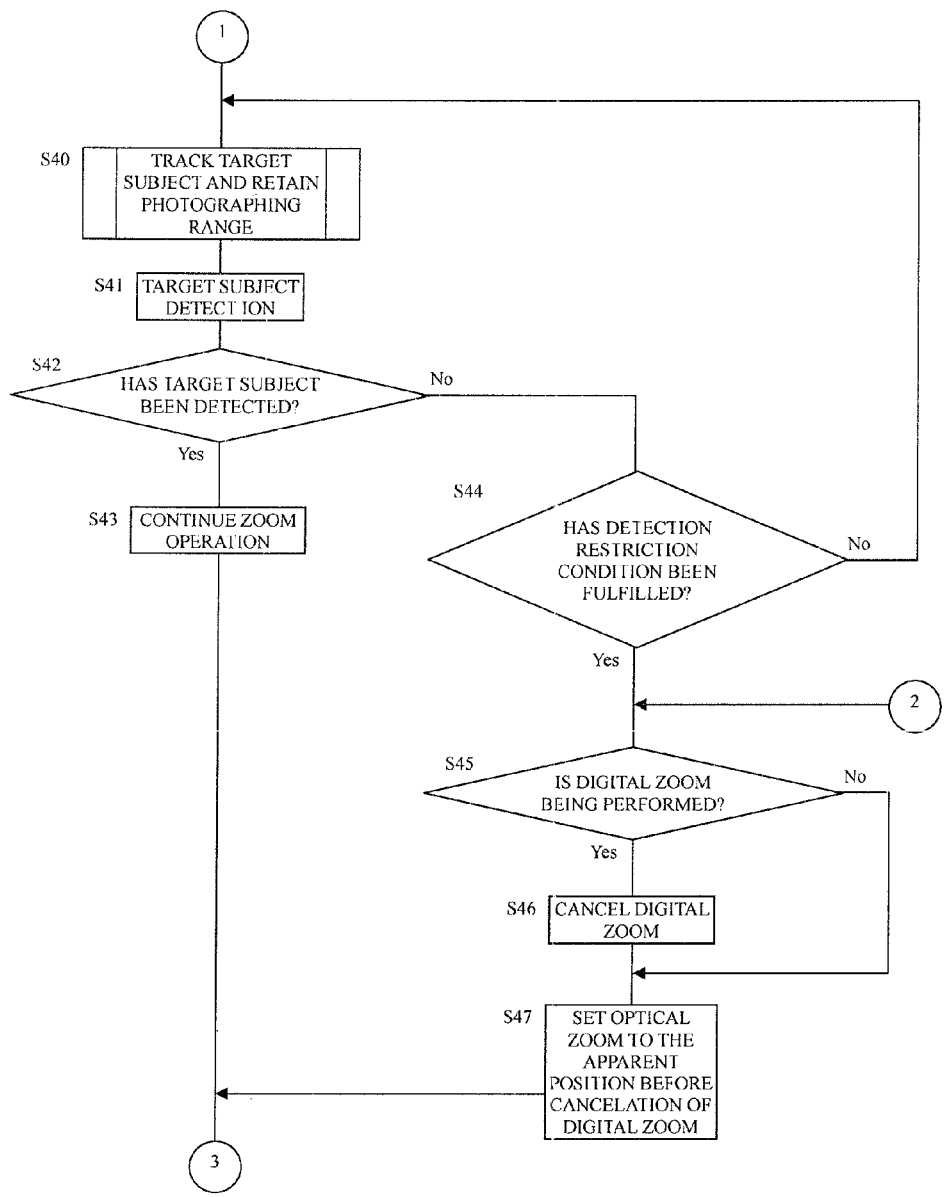
Figure 6:
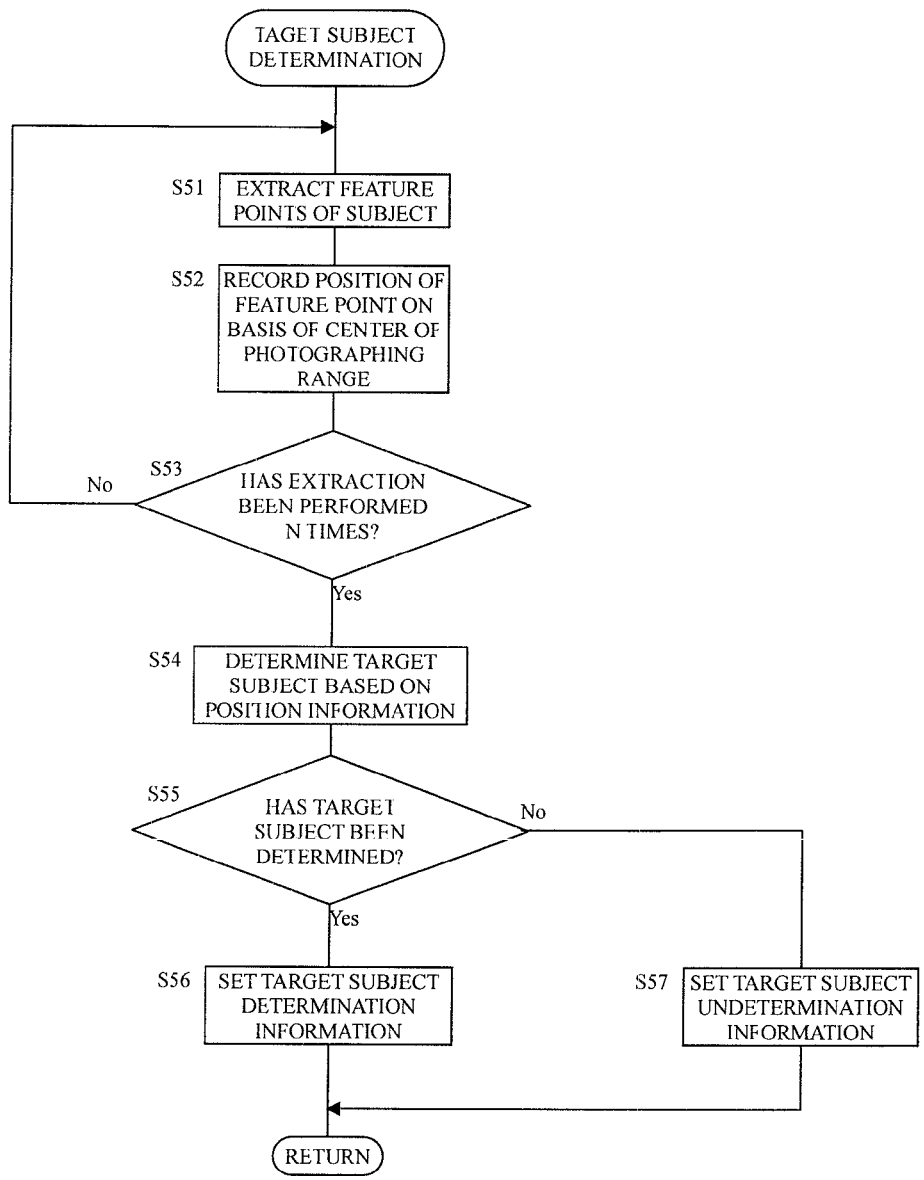
FIG. 6 is a sub flowchart for describing a target subject determination operation of the second embodiment.
Figure 7:
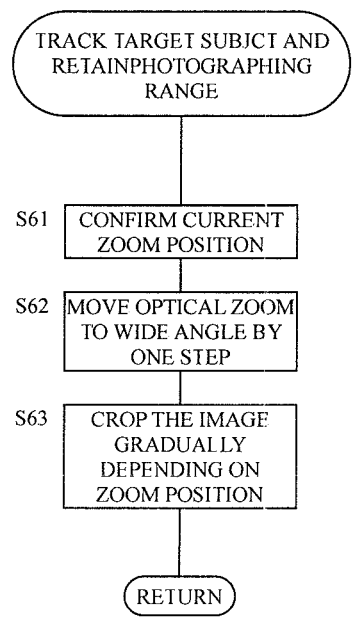
FIG. 7 is a sub flowchart for describing a track target subject and retain photographing operation of the second embodiment.

FIG. 5 is a main flowchart showing the second embodiment of the invention and FIGS. 6 and 7 are sub flowcharts of the second embodiment.

An example hardware configuration of the second embodiment is similar to that of the first embodiment.

The target subject 30a goes out of the photographer's photographing range by the optical zoom to the telephoto angle.

However, according to the above-described first embodiment, the optical zoom and the digital zoom are simultaneously performed so that zoom can be continuously performed and the target subject 30a can re-enter and/or remain in the photographing area.

According to the second embodiment, the optical zoom and the digital zoom are simultaneously performed when the target subject 30a deviates from near the optical axis.

In FIG. 5, when the zoom operation is started, at step S31, the photographing range control unit 12d determines whether or not the zoom operation is moved toward the telephoto angle.

If the optical zoom operation is moved toward the telephoto angle, at step S32, the photographing range control unit 12d controls the lens control unit 12b to generate a zoom signal to the telephoto angle and send the zoom signal to the lens CPU 23 via the body communication unit 13 and the lens communication unit 28.

The lens CPU 23 receives the zoom signal and then drives the drive unit 24. The optical zoom changes to the telephoto angle.

At step S33, the photographing range control unit 12d determines the target subject 30a based on the detection result of the feature detection unit 18.

FIG. 6 shows a specific operation flow for an example target subject 30a determination at step S33 in FIG. 5.

At step S34, the photographing range control unit 12d determines whether or not the target subject 30a has been determined If the target subject 30a has not been determined, at step S35, it is determined that whether or not a condition to end the determination has been fulfilled.

If the condition has not been fulfilled, the process returns to the determination process at step S33.

If, on the other hand, the target subject 30a has been determined at step S34, the process proceeds to step S36.

The photographing range control unit 12d detects the target subject 30a from the image.

At step S37, the photographing range control unit 12d tracks the target subject 30a using the detection result of the feature detection unit 18 and the set target subject 30a information to determine whether or not the target subject 30a is located near the optical axis.

If the target subject 30a is located near the optical axis, the process proceeds to step S38.

At step S38, the photographing range control unit 12d continues the optical zoom.

At step S39, the photographing range control unit 12d determines whether or not the optical zoom operation has been ended.

If the zoom operation has not been ended, the process returns to step S36.

Referring back to step S37, if the target subject 30a shifts from the optical axis during the optical zoom to the telephoto angle such that the target subject 30a is no longer within the predetermined distance of the optical axis, the process proceeds to step S40 (via node "1") and the photographing range control unit 12d tracks the target subject 30a and retains the photographer's photographing range.

FIG. 7 shows a specific example operation flow of step S40 in FIG. 5.

At step S41, the photographing range control unit 12d detects the target subject 30a (as was the case with step S34).

At step S42, the photographing range control unit 12d determines whether or not the target subject 30a has been detected.

If he target subject 30a has been detected, the process proceeds to step S43 and the zooming is continued.

The target subject 30a might not be detected at step S42 when, for example, motion of the target subject 30a is large or change of zoom magnification is fast.

For such case, the process proceeds to step S44 and the photographing range control unit 12d determines whether or not a detection restriction condition has been fulfilled.

One example of a detection restriction condition is that the optical zoom has reached the wide end.

If the optical zoom has not reached the wide end (or more generally, if a detection restriction condition does not occur), the process returns to step S40 and the optical zoom is changed to the wide angle.

Referring back to step S42, if the target subject 30a can be detected, the zooming is continued at step S43.

Referring back to both step S35 and S44, when it is determined that the determination condition has been fulfilled at step S35 or that the detection restriction condition has been fulfilled at step S44, the process proceeds to step S45 and the photographing range control unit 12d determines whether or not the digital zoom is currently being performed.

If the digital zoom is being performed, the photographing range control unit 12d cancels the digital zoom at step S46.

At step S47, the optical zoom is set to the apparent zoom position (Recall the dotted lines of FIGS. 3(a) and 3(b).) before cancelling the digital zoom. And then the process returns to step S39.

Referring back to step S45, if the digital zoom is not being performed, the optical zoom is continued at step S47 and then the process returns to step S39.

Subsequently the processes of steps S36 to S47 are repeated until the zoom operation is ended, and the optical zoom and the digital zoom are controlled so that apparent zoom to the telephoto angle is performed while the target subject 30a is located near (that is, within a predetermined distance of) the center of the photographer's photographing range.

The operation according to the target subject 30a determination will be described with reference to a flowchart shown in FIG. 6.

At step S51, the feature detection unit 18 extracts feature points at a current photographer's photographing range all over the range to be photographed.

At step S52, the photographing range control unit 12d records the feature points of each subject and a position of the feature points relative to the optical axis.

At step S53, it is determined whether or not the extraction has been performed N times and, if not, the processes in steps S51 and S52 are repeated until they are performed N times.

The photographer P locates the target subject 30a of plurality subjects near the center of the photographer's photographing range.

Therefore the target subject 30a is located near the center of the photographer's photographing range even when the other subjects move.

At step S54, based on the recorded feature position information, the photographing range control unit 12d determines a subject that has been located most times near the center of the photographer's photographing range, and defines this subject as the target subject 30a.

If the target subject 30a has been determined at step S55, the process proceeds to step S56 and the photographing range control unit 12d sets a flag of target subject 30a determination information to ON.

If the target subject 30a has not been determined, the process proceeds to step S57 and the photographing range control unit 12d sets the flag of target subject 30a determination information to OFF. After either step S56 or S57, the process returns main flow.

The operation according to S40, that tracks the target subject 30a and retains the photographer's photographing range, will be described with reference to a flowchart shown in FIG. 7.

At step S61, the photographing range control unit 12d confirms a current zoom position.

At step S62, the photographing range control unit 12d changes the optical zoom to the wide angle.

At step S63, cropping control unit 12c crops the image gradually depending on zoom position. And then process returns main flow.

As a result, as described above with respect to FIGS. 4(b1)-(b3), the optical zoom is moved to the wide angle and the digital zoom is moved to the telephoto angle while the target subject 30a is tracked near the center of the photographer's photographing range and the apparent photographer's photographing range is controlled to continuously move towards the telephoto angle.

As described above, the zoom control is performed by the optical zoom and the digital zoom while the target subject 30a is located near (that is, within a predetermined distance of) the center of the photographer's photographing range so that the photographer's photographing range can be acquired according to the zoom operation by the photographer P.

Thereby the zoom control shown in FIG. 4 is possible.

FIGS. 8(a)-(e) are explanatory diagrams for describing zoom processing according to this second example embodiment.

Figure 8:
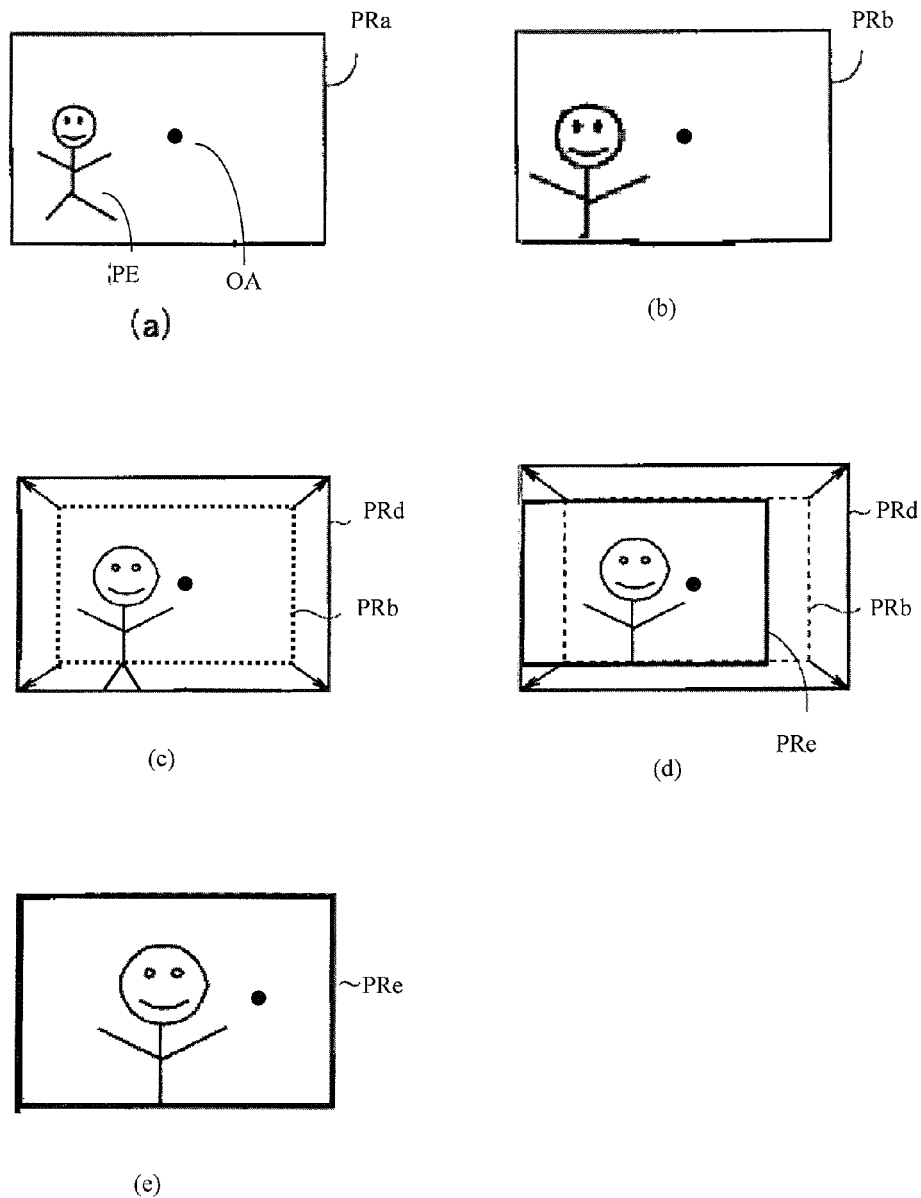
FIGS. 8(a)-8(e) are explanatory diagrams for describing zoom control according to the second embodiment.

A person PE as the target subject 30a is in the photographer's photographing range PRa in FIG. 8(a).

The photographer's photographing range PRa has been narrowed to PRb by the optical zoom to the telephoto angle in FIG. 8(b).

The person PE is enlarged and located on the periphery of the PRb.

The optical zoom is returned to the wide angle to set a wide photographer's photographing range PRd in FIG. 8(c).

Further, the photographer's photographing range PRe, which is a part of the PRd, is cropped to acquire an image in FIG. 8(d).

At the time, the cropping position is set so that the person PE is located near the center of the PRd.

The cropping size is set so that the optical zoom to the wide angle has been cancelled and the photographer P perceives that the zoom operation to the telephoto angle is continuously performed.

As a result, the person PE as the target subject 30a is located near the center of the PRe in FIG. 8(e).

Figure 9:
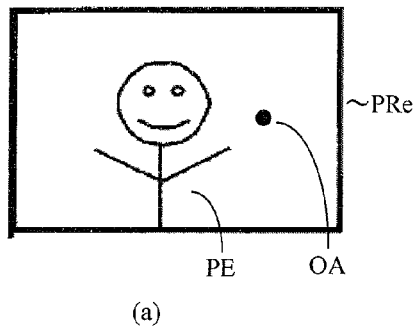
FIGS. 9(a)-9(g) are explanatory diagrams for describing zoom control according to the second embodiment.
Figure 9:
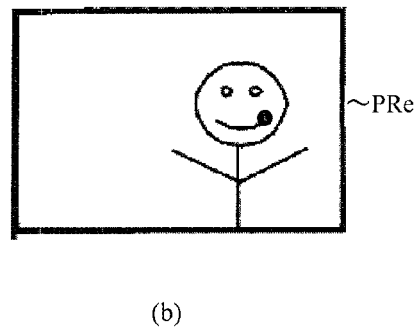
Figure 9:
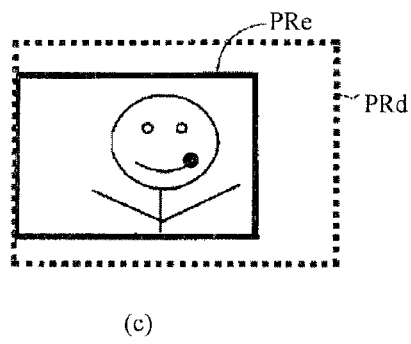
Figure 9:
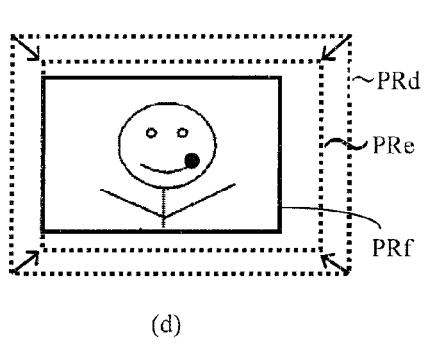
Figure 9:
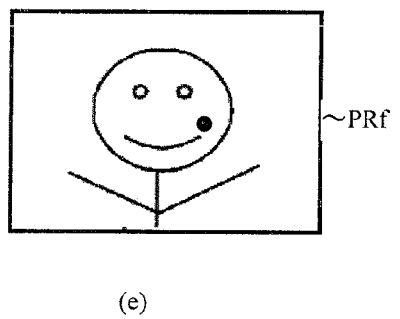
Figure 9:
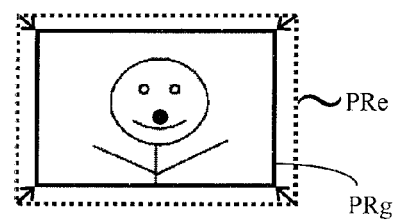
Figure 9:
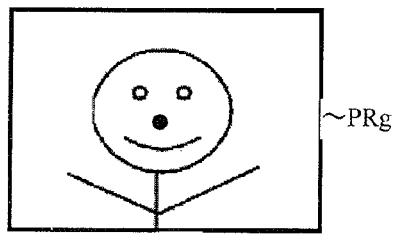

The person PE as the target subject 30a is located periphery of the photographer's photographing range PRe which is already cropped the image by the digital zoom in FIG. 9(a).

Assume that the person PE has moved closer to the optical axis OA due to adjustment of orientation of the digital camera 1 by the photographer P, movement of the person PE, and/or the like, as shown in FIG. 9(b).

At the time, the optical photographer's photographing range PRd is wide as shown in FIG. 9(c).

The cropping range by digital zoom is also changed to PRf, as shown in FIG. 9(d).

The wide photographer's photographing range PRd is changed to the slight narrow photographer's photographing range PRe by the optical zoom to the telephoto angle, and the cropping range PRf is designated by the digital zoom so that the person PE is located near the center of the photographer's photographing range PRf in FIG. 9(e).

The person PE has moved closer to the optical axis OA in FIG. 9(f).

The cropping the image by the digital zoom is no longer necessary, and it is sufficient to use only the optical zoom.

The digital zoom is ended and a photographer's photographing range PRg achieved using only the optical zoom is depicted in FIG. 9(g).

With each example embodiment consistent with the present invention, a device for taking pictures has been described using a digital camera. It is also possible to use a digital single lens reflex camera or a compact digital camera, a camera for movie use such as a video camera, a security camera or a remote-control camera, and further to have a camera that is incorporated into a mobile phone, a mobile information terminal (PDA: Personal Digital Assistant), a game console etc. It is also possible to use the processes described above in other optical devices, such as those for industrial or medical, including endoscopes and microscopes.

It may be similarly applicable to an observation instrument such as binoculars, a telescope, and a security camera with a tracking function.

The present invention is not limited to these embodiments, and structural elements may be modified in an actual implementation.

It is also possible form various inventions by suitably combining the plurality structural elements disclosed in the above described embodiments.

For example, it is possible to omit some of the structural elements shown in the embodiments. It is also possible to suitably combine structural elements from different embodiments.

For the sake of convenience, description provided by the specification may have used words representing sequence, such as "first" and "next." However, it is not to be inferred that a described order is required unless expressly stated as being necessary.

Additionally, one or more steps forming the example operation flows may be omitted if such omission has no effect on the essence of the invention.

Most techniques of the control and the functions described herein mainly by the flowcharts are program-settable.

A computer reads and executes a program and the above-described control and functions can be implemented.

The program can be recorded or stored wholly or partly in a portable medium of a nonvolatile memory such as a flexible disk, CD-ROM and the like, or on a storage medium of a volatile memory such as a hard disk, as a computer program product, and distributed or provided as product shipment or via a portable medium or communications network.

The photographing apparatus according to the embodiments can be readily implemented by a user downloading the program via the communication network and installing it on a computer, or by installing on a computer from a storage medium.

What is claimed is:

1. A photographing method comprising:
   a) setting a subject as a target subject;
   b) determining, automatically, at least one of whether the target subject is at a periphery of a photographer's photographing range and whether the target subject is leaving the photographer's photographing range;
   c) responsive to one of a determination that the target subject is at a periphery of the photographer's photographing range, or a determination that the target subject is leaving the photographer's photographing range, cropping, automatically, an image include the target subject using a digital zoom operation; and
   d) responsive to one of a determination that the target subject is at a periphery of the photographer's photographing range or a determination that the target subject is going out of the photographer's photographing range, zooming out using an optical zoom operation,
   wherein a timing of the cropping operation is controlled in accordance with a speed of the optical zoom.

2. The photographing method according to claim 1 further comprising:
   responsive to a determination that the target subject is at a periphery of the photographer's photographing range, reducing at least one of a zoom-in speed of the optical zoom operation and a cropping range changing speed of the digital zoom operation.

3. A photographing method comprising:
   a) setting a subject as a target subject;
   b) determining, automatically, at least one of whether the target subject is at a periphery of a photographer's photographing range and whether the target subject is leaving the photographer's photographing range;
   c) responsive to one of a determination that the target subject is at a periphery of the photographer's photographing range, or a determination that the target subject is leaving the photographer's photographing range, cropping, automatically, an image include the target subject using a digital zoom operation; and d) responsive to one of a determination that the target subject is at a periphery of the photographer's photographing range and a determination that the target subject is going out of the photographer's photographing range, zooming out using an optical zoom operation, wherein the optical zooming out and the cropping are performed when it is determined that the target subject is leaving the photographer's photographing range due to at least one of the optical zooming in, a moving of the photographer's photographing range and motion of the target subject.

4. The photographing method according to claim 1 wherein the act of cropping the image is performed such that the target subject is provided near a center of the photographer's photographing range.

5. A photographing method comprising:
a) setting a subject as a target subject;
b) determining, automatically, at least one of whether the target subject is at a periphery of a photographer's photographing range and whether the target subject is leaving the photographer's photographing range;
c) responsive to one of a determination that the target subject is at a periphery of the photographer's photographing range, or a determination that the target subject is leaving the photographer's photographing range, cropping, automatically, an image include the target subject using a digital zoom operation; and
d) responsive to one of a determination that the target subject is at a periphery of the photographer's photographing range and a determination that the target subject is leaving the photographer's photographing range, zooming out using an optical zoom operation, wherein the cropping and optical zooming out are combined such that a changing speed of a photographer's photographing range is constant.

6. For use in a digital imaging apparatus including an image capturing unit and a lens system for directing light onto the image capturing unit and being capable of providing an optical zoom operation, the digital imaging apparatus capable of performing a digital zoom operation, a photographing method for maintaining a target subject within a photographer's photographing range defined by the smaller of the bounds of the image capturing unit and a cropped portion of the image capturing unit, the method comprising:

a) repeatedly capturing, by the image capturing unit, an image including the target subject;
b) for each of the images captured,
 1) determining, automatically, a distance of the target subject from a center of the photographer's photographing range, and
 2) when an optical zooming in is performed, responsive to a determination that a distance of the target subject from the center of the photographer's photographing range is greater than a predetermined value, performing (A) an optical zooming out and (B) a digital cropping, such that the target subject remains within the photographer's photographing range.

7. The method according to claim 6 wherein:
responsive to zoom operation to zooming telephoto angle, performing at least one of (A) the optical zooming out or (B) the digital cropping.

8. The method according to claim 7 wherein:
performing at least one of (A) the optical zooming out or (B) the digital cropping so that the photographing range is a telephoto angle.

9. The method according to claim 6 wherein:
the optical zooming out and the digital cropping are performed cooperatively.

10. The method according to claim 9 wherein:
the optical zooming out and the digital cropping are performed cooperatively so that the photographing range is a telephoto angle.

* * * * *